United States Patent [19]

Andersen

[11] Patent Number: 5,090,186
[45] Date of Patent: Feb. 25, 1992

[54] ROTOR CUTTER

[75] Inventor: Bernt Andersen, Tollose, Denmark

[73] Assignee: Spragelse Maskinfabrik A/S, Denmark

[21] Appl. No.: 603,789

[22] Filed: Oct. 25, 1990

[51] Int. Cl.⁵ ............................................. A01D 34/82
[52] U.S. Cl. ...................................... 56/255; 56/295; 56/DIG. 17
[58] Field of Search ............... 56/255, 295, 6, DIG. 9, 56/DIG. 17

[56] References Cited

U.S. PATENT DOCUMENTS

| | | | |
|---|---|---|---|
| 2,963,844 | 12/1960 | Engler | 56/295 |
| 3,643,409 | 2/1972 | Jones | 56/295 |
| 4,141,202 | 2/1979 | Osterling | 56/295 |

FOREIGN PATENT DOCUMENTS

| | | | |
|---|---|---|---|
| 1299157 | 7/1969 | Fed. Rep. of Germany | |
| 2612381 | 10/1977 | Fed. Rep. of Germany | 56/295 |
| 292044 | 11/1980 | Fed. Rep. of Germany | |
| 1220353 | 1/1971 | United Kingdom | |
| 1366072 | 9/1974 | United Kingdom | |

Primary Examiner—Terry L. Melius
Attorney, Agent, or Firm—Scully, Scott, Murphy & Presser

[57] ABSTRACT

A rotor cutter comprises a cutting member (1) adapted to be driven into rotation about an axis of rotation (3). The cutting member comprises a knife holder (6) connected with a knife (12). The knife (12) comprises a blade, which during the rotation of the cutting member (1) rotates in a plane substantially perpendicular to the axis of rotation (3) of the cutting member (1). The knife (12) comprises furthermore a shank (13) rotatably journalled relative to the knife holder (6) about a swivel axis (11), said swivel axis forming an acute angle ($\alpha$) with the axis of rotation (3) of the cutting member (1), the angle space of said angle facing upwards.

13 Claims, 1 Drawing Sheet

ROTOR CUTTER

FIELD OF THE INVENTION

The invention relates to a rotor cutter comprising a cutting member adapted to be driven into rotation about an axis of rotation, where said cutting member comprises a knife holder connected with a knife having a shank extending downwards from said knife holder, and where the shank at its upper end is rotatably journalled about a swivel axis relative to the knife holder, said swivel axis forming an acute angle with upward angle spaces with the axis of rotation of the cutting member, and where the knife is provided with a blade at the lower end of the shank, the rotation of the cutting member causing said blade to rotate in a plane substantially perpendicular to the axis of rotation of said cutting member.

The expression "rotor cutter" includes all cutters comprising a rotating cutting member, such as rotary lawn mowers, reapers, topping machines etc.

BACKGROUND ART

GB-PS No. 1.220,353 discloses a rotor cutter of the above type, which comprises a cutting member arranged on a vertical rotary shaft. The cutting member comprises a knife holder mounted at the lower end of the shaft, a plurality of knives with a shank extending downwards and outwards from said knife holder, and a blade formed integral with said shank and adapted to rotate in a plane perpendicular to the longitudinal axis of the rotary shaft. At the upper end the shank of the knife is pivotally connected to the knife holder by means of a pin. The longitudinal axis of the pin forms an acute angle with the rotary shaft. By such a rotor cutter, the shank of the knife is subjected to a large moment especially at its upper end due to the centrifugal force caused by the rotation of the cutting member. The shank of the knife must therefore be relatively thick in order to resist the above moment. On the other hand, the knife blade must be relatively thin in order to provide the best possible cutting result. An unfortunate result of the above contradicting conditions is that such a knife is relatively expensive to manufacture. The integral forming of the shank and the blade of the knife is furthermore encumbered with the drawback that the entire knife must be replaced when the blade is damaged, which in turn results in high operating expenses. The achievable cutting result suffers furthermore from the drawback that the entire knife swivels upwards and backwards when nothing but the blade hits an obstacle.

DE-PS No. 29 20 244 discloses a rotor cutter where the knife holder of the cutting member is a disk. On the bottom side of the disk, knives are rotatably arranged about an axis parallel to the axis of rotation of the cutting member, said knives projecting radially outwards from the disk when the cutting member is rotating. As a result the knives turn and clear possible obstacles such as a small stone or a stump. Experience has, however, shown that this type of cutting members involves a high risk of said cutting member and the driving mechanism causing said member to rotate being seriously damaged when the cutting member hits a large object such as a large stone or a large stump.

SUMMARY OF INVENTION

The object of the invention is to provide a rotor cutter of the above type, which at low operating costs reduces the risk of damages of the cutting member and the driving mechanism when the knife hits obstacles while achieving an excellent cutting result.

The rotor cutter according to the invention is characterized in that the blade is rotatably journalled about an axis of rotation relative to the shank. When the shank of the knife hits an obstacle, the entire knife swivels backwards and upwards about the swivel axis so as to clear said obstacle. However, when the blade hits an obstacle, only the blade and not the entire knife is turned, which presents an advantage for the achievement of a very uniform cutting result because then the blade returns faster to its cutting position than when the entire knife is turned. As the blade of the knife can be turned relative to the shank of the knife, the moment arm is reduced such that the total risk of damage to the cutting member and its driving mechanism is simultaneously reduced when the knife hits an obstacle, said moment arm transferring the moment to the shank of the knife when said knife hits an obstacle. Finally, the costs involved in replacing damaged blades are very low because the form of the blades is very simple with the result that the manufacture of said blades is very inexpensive.

According to the invention the axis of rotation may be substantially parallel to the axis of rotation of the cutting member. As a result, the blade of the knife remains in its cutting plane when it hits an obstacle, which presents an advantage for the achievement of an optimal cutting result. Thus such an embodiment of the invention turned out in practice to render it possible to achieve a cutting result of the same quality as is obtained by means of lawn mowers having cutting cylinders.

Moreover, the blade may according to the invention be replaceably connected to the shank. Such an embodiment of the invention is considered particularly advantageous for achieving low operating costs.

Furthermore the angle formed by the swivel axis of the knife and the axis of rotation of the cutting member may be in the range 30° to 60°, and preferably in the range 40° to 50°, said ranges having proved to be particularly advantageous in practice.

Finally according to the invention the rotatable journalling of the knife relative to the knife holder may be situated a short distance from the axis of rotation of the cutting member, said rotatable journalling forming the swivel axis. As a result the knife holder can advantageously be shaped such that transverse to the axis of rotation of the cutting member said holder is of a small dimension which minimizes the risk of exactly this portion of the cutting member hitting an obstacle in the ground and of the cutting member and/or its driving mechanism being damaged.

BRIEF DESCRIPTION OF THE DRAWINGS

The invention is explained in greater detail below with reference to the accompanying drawing, in which the FIGURE is an axial, sectional view through an embodiment of a cutting member for a rotor cutter according to the invention.

DESCRIPTION OF THE PREFERRED EMBODIMENTS

Figure 1:
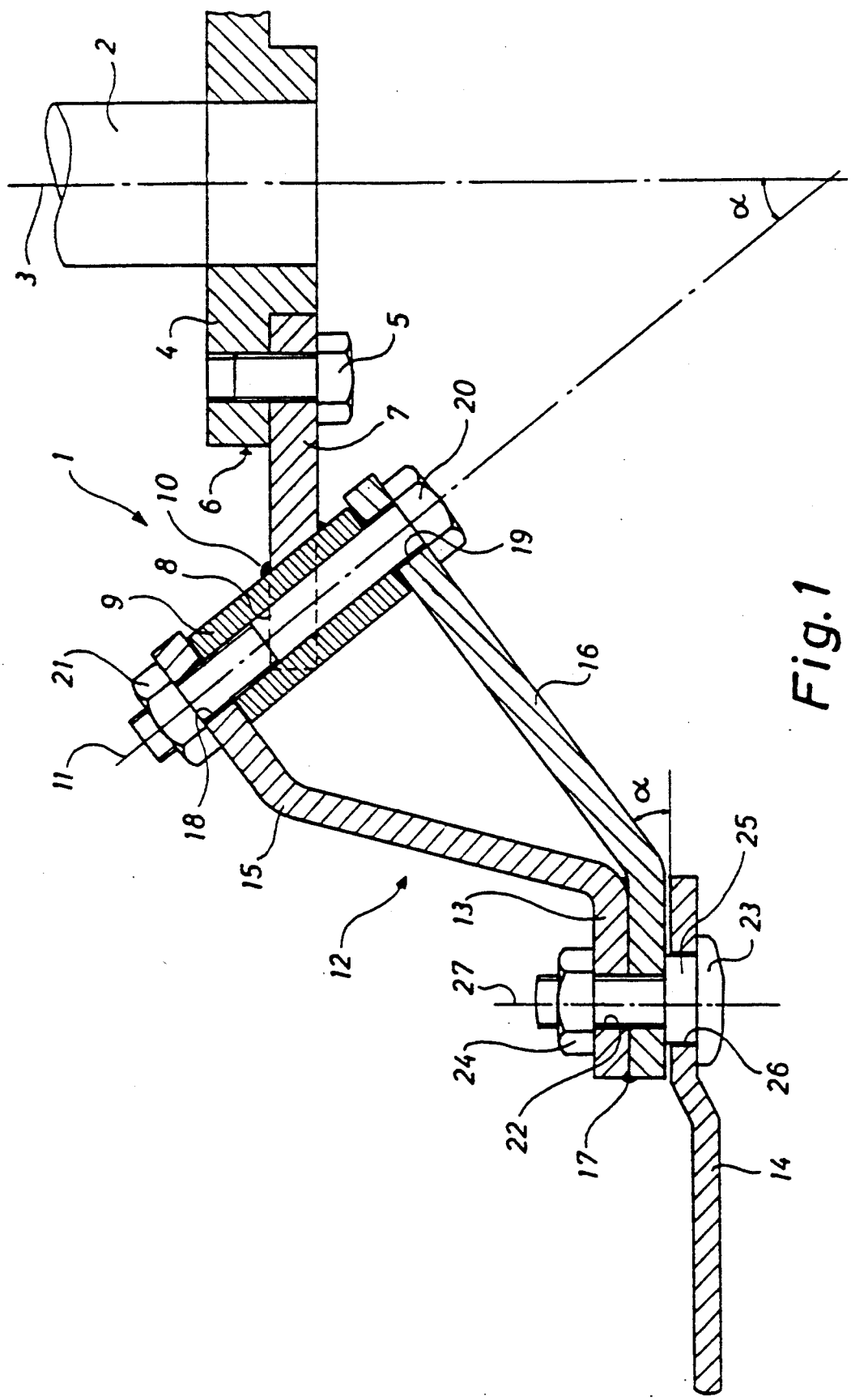

The cutting member 1 of the FIGURE is fixedly connected to a substantially vertical shaft 2 adapted to cause the cutting member to rotate about a vertical axis of rotation 3 by means of a driving mechanism not shown. The cutting member 1 comprises a hub 4 fixedly connected to the shaft 2. A knife holder 6 is bolted onto the hub 4 by means of screws 5, said knife holder 6 comprising a disk 7. Two diametrically opposing notches 8 are shaped at the periphery of the disk 7, only one notch appearing from the drawing. A bushing 9 is situated in each notch and is welded at 10 to the disk 7 in such a manner that the axis 11 of the bushing forms an angle $\alpha$ of about 45° with the axis of rotation 3 of the cutting member. The angle can, however, be arbitrarily chosen in the range of 0° to 90°. The axis 11 of the bushing 9 is a swivel axis for a knife 12 comprising a shank 13 and a blade 14. The shank 13 is shaped like a two-legged fork and is formed by two flat bars welded together at one end at 17 and forming the legs 15, 16 of the fork at the opposite end. The distance between the legs of the fork corresponds substantially to the length of the bushing 9. Each leg is at its free end provided with an opening 18, 19, and a bolt 20 extends through each of these openings 18, 19 and through the bushing 9. A nut 21 is screwed onto the end of the bolt 20. Accordingly the bolt 20 forms the swivel axis 11 for the knife 12.

The opposite end of the fork-shaped shank 13 is provided with an opening 22 allowing passage of a bolt 23. The bolt 23 is secured by means of a nut 24 and comprises a shank portion 25 of a larger diameter than the opening 22. The blade 14 is situated on the shank portion 25 and comprises at one end an opening 26 of an inner diameter slightly larger than the outer diameter of the shank portion. As a result the blade 14 is rotatably arranged about an axis of rotation 27 formed by the axis of the bolt 23 and being substantially parallel to the axis of rotation 3 of the cutting member 1.

When the cutting member 1 is rotating, the blade 14 sweeps a plane substantially perpendicular to the axis of rotation 3, and the shank 13 and the blade 14 of the knife 12 are in the position shown in the FIGURE where they project radially outwards from the axis of rotation 3 of said cutting member 1. When only the blade 14 hits an obstacle, said blade swivels backwards and clears said obstacle. When also the shank 13 hits the obstacle, said shank 13 and consequently also the blade 14 swivels backwards and upwards about the swivel axis 11 and clears the obstacle.

The invention may be modified in many ways without thereby deviating from the scope thereof. Thus the swivel axis 11 of the knife and the axis of rotation 3 of the cutting member may be skewly situated relative to one another instead of being situated in a common plane, in case such a solution is advantageous. Furthermore the rotor cutter may be provided with a plurality of cutting members.

I claim:

1. A rotor cutter comprising a cutting member adapted to be connected to a driving member for rotation therewith about a first axis, the cutting member comprising:
   a knife holder;
   a knife connected to and extending outward and downward from the knife holder and including
   (i) a knife shank having upper and lower ends,
   (ii) a cutting blade extending outward from the lower end of the shank, wherein rotation of the cutting member rotates the cutting blade in a plane perpendicular to the first axis, and
   (iii) means connecting the cutting blade to the lower end of the shank for rotary movement therewith about the first axis and for pivotal movement relative to the shank and about a second axis; and
   means connecting the upper end of the shank to the knife holder for rotary movement therewith about the first axis and for pivotal movement about a swivel axis, said swivel axis forming an upwardly facing acute angle with the first axis.

2. A rotor cutter as in claim 1, wherein the second axis of rotation (27) extends substantially parallel to the first axis of rotation (3).

3. A rotor cutter as in claim 1 or claim 2, wherein the cutting blade (14) is releasably connected to the shank (13).

4. A rotor cutter as in claim 1, wherein the angle ($\alpha$) formed by the swivel axis (11) of the knife and the first axis or rotation (3) is between 30° to 60°.

5. A rotor cutter according to claim 4, wherein the angle formed by the swivel axis and the first axis is between 40° and 50°.

6. A rotor cutter according to claim 1 or claim 4, wherein the means connecting the shank to the knife holder defines the swivel axis and is spaced from the first axis.

7. A rotor cutter according to claim 1, wherein:
   the cutting member further comprises
   (i) a hub for connecting the cutting member to the driving member for rotary movement therewith about the first axis, and
   (ii) means releasably connecting the knife holder to the hub for rotary movement therewith;
   the means connecting the cutting blade to the shank releasably connects the cutting blade thereto; and
   the means connecting the shank to the knife holder releasably connects the shank thereto.

8. A rotor cutter according to claim 1, wherein:
   the means connecting the shank to the knife holder includes a bushing connected to the knife holder for rotary movement therewith about the first axis;
   the shank includes
   (i) a first leg having upper and lower ends, and
   (ii) a second leg having upper and lower ends; and
   the means connecting the shank to the knife holder further includes bolt means connecting the upper ends of the first and second legs to the bushing for said pivotal movement about said swivel axis.

9. A rotor cutter according to claim 8, wherein:
   the bushing has first and second opposite axial ends;
   the upper end of the first leg extends over and immediately adjacent to the first end of the bushing; and
   the upper end of the second leg extends beneath and immediately adjacent to the second end of the bushing.

10. A rotor cutter according to claim 8, wherein the bushing defines the swivel axis and is spaced from the first axis.

11. A rotor cutter according to claim 8, wherein the means connected the cutting blade to the lower end of the shank connects together the lower end of the first and second legs, and connects the cutting blade to the lower ends of said first and second legs for said pivotal movement about said second axis.

12. A rotor cutter according to claim 11, wherein:
   the means connecting the cutting blade to the lower end of the shank includes bolt means extending through the cutting blade and the lower ends of the first and second legs; and the bolt means securely clamps together the lower ends of the first and second legs and supports the cutting blade for pivotal movement about the second axis.

13. A rotor cutter according to claim 12, wherein:
the bolt means includes a bolt head;
the cutting blade is pivotally mounted on the bolt means, between the bolt head and the lower end of the knife shank; and
the bolt means further includes a bolt shank disposed between the bolt head and the lower end of the knife shank to keep the bolt head spaced from the knife shank and to facilitate rotation of the cutting blade about said second axis.

* * * * *